Feb. 8, 1927. 1,616,679
E. J. BRANDT
COIN DELIVERY MACHINE
Filed Jan. 23 1925 7 Sheets-Sheet 1

Inventor
Edward J. Brandt

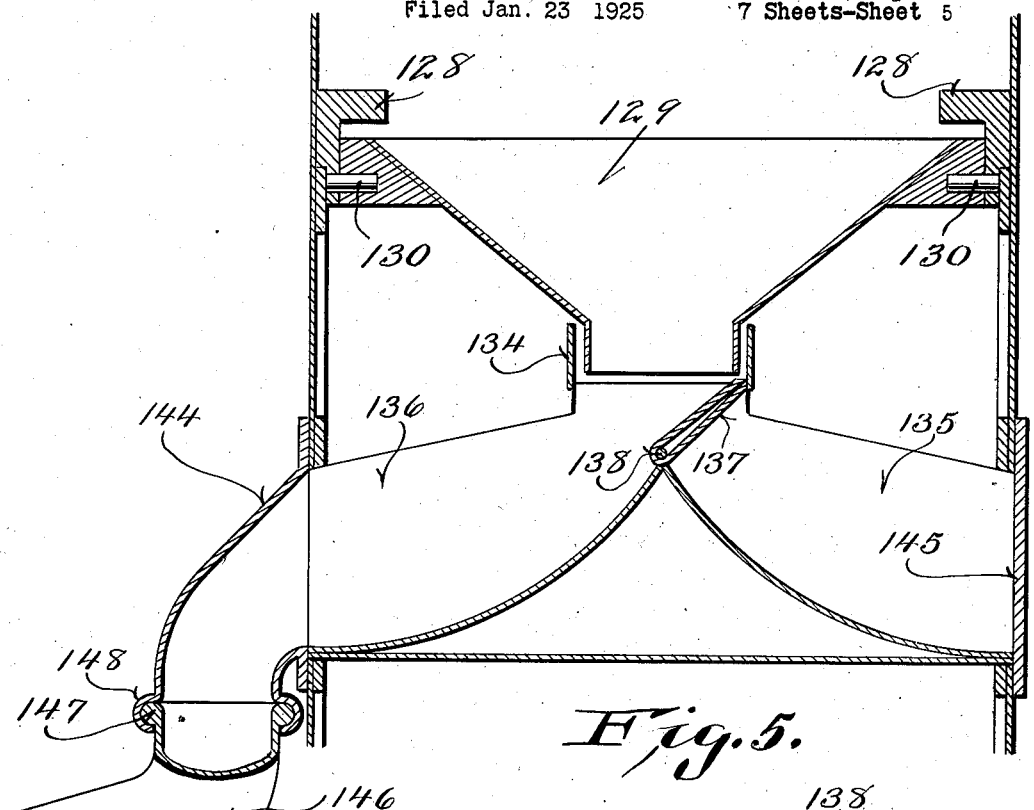
Fig. 5.
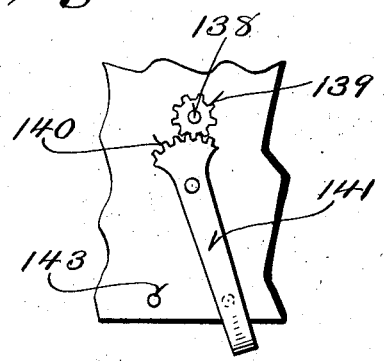
Fig. 6.
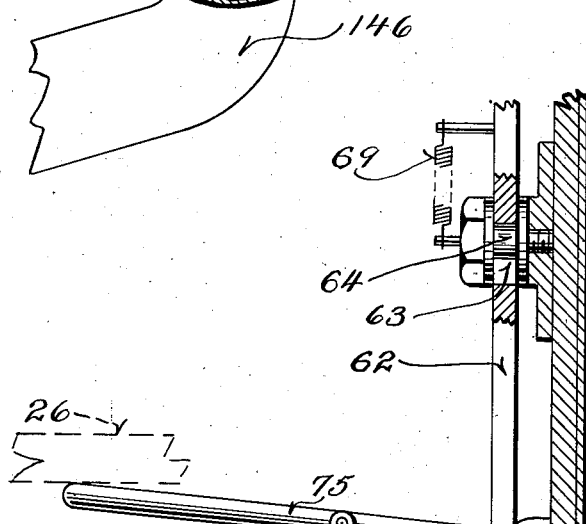
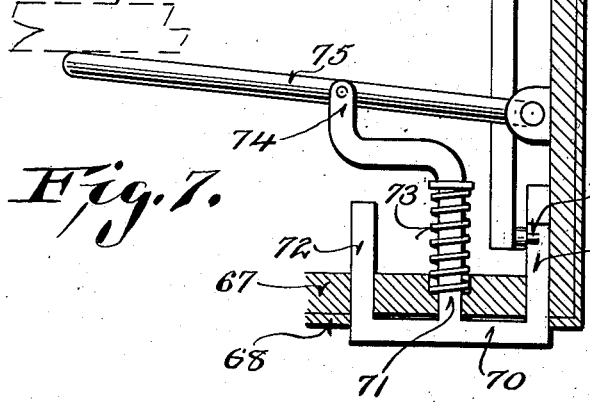
Fig. 7.
Inventor
Edward J. Brandt Feb. 8, 1927.
E. J. BRANDT
1,616,679
COIN DELIVERY MACHINE
Filed Jan. 23, 1925
7 Sheets-Sheet 6
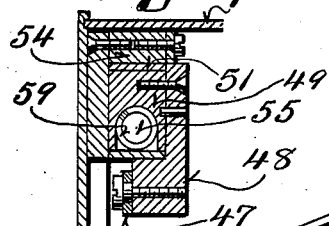
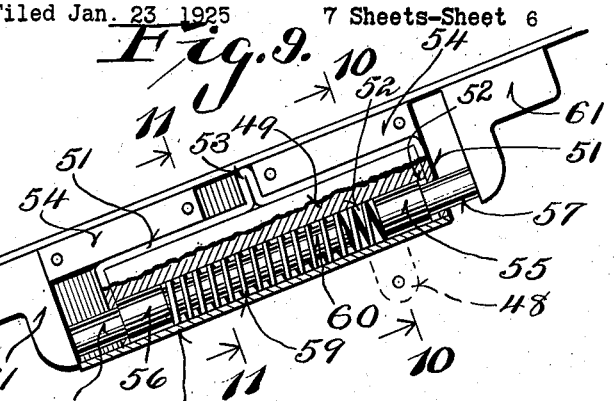
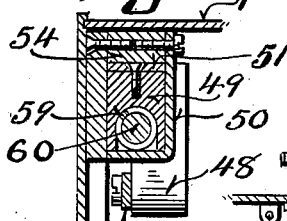
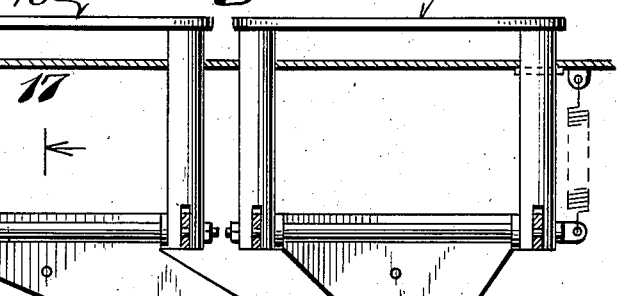
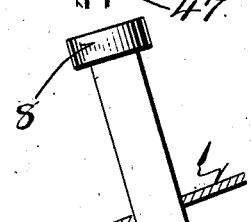
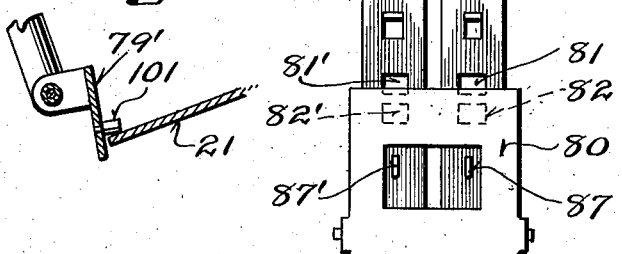
Inventor
Edward J. Brandt Feb. 8, 1927.                                                    1,616,679
E. J. BRANDT
COIN DELIVERY MACHINE
Filed Jan. 23, 1925          7 Sheets-Sheet 7
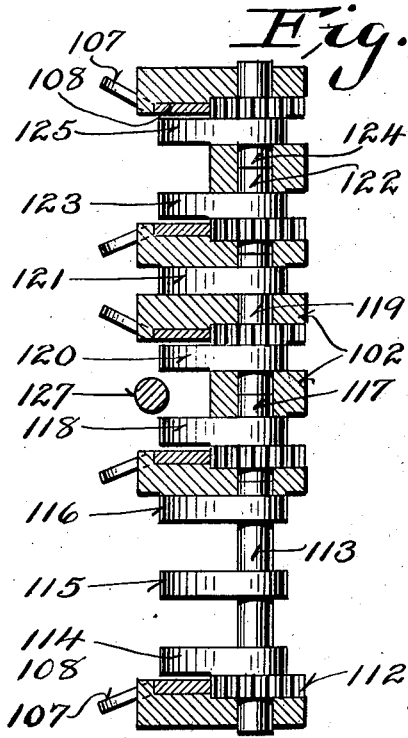
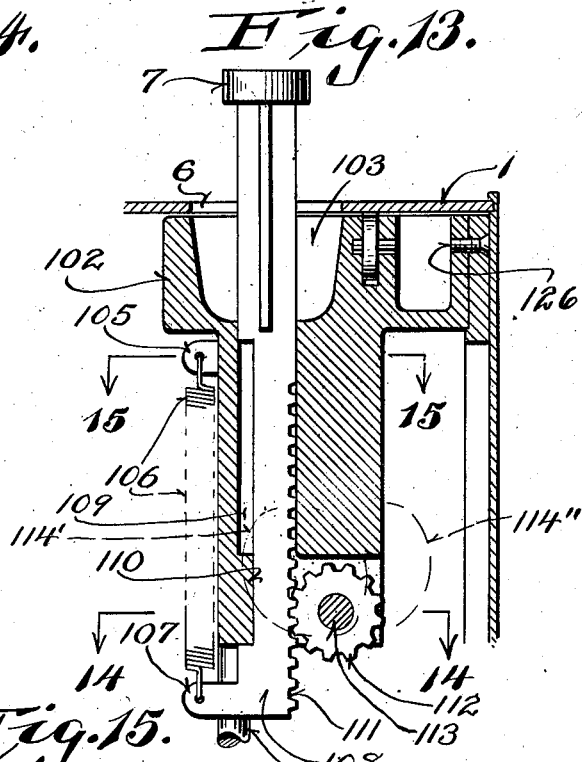
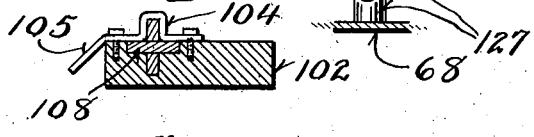
Inventor
Edward J. Brandt
By
Attorneys Patented Feb. 8, 1927.

1,616,679

UNITED STATES PATENT OFFICE.

EDWARD J. BRANDT, OF WATERTOWN, WISCONSIN, ASSIGNOR TO BRANDT AUTOMATIC CASHIER COMPANY, OF WATERTOWN, WISCONSIN, A CORPORATION OF WISCONSIN.

COIN-DELIVERY MACHINE.

Application filed January 23, 1925. Serial No. 4,199.

This invention relates to a coin delivery machine and is particularly directed to a money handling machine which is generally known as the "Brandt" type of automatic cashier.

In more detail, this invention relates to a machine which can operate upon either a "payer" basis or a "changer" basis and which is adapted to deliver either the amount indicated upon the particular key depressed or the change or difference between this amount and a dollar or certain predetermined fractions thereof.

This invention is an improvement over that disclosed in my copending application for money handling machines, Serial No. 715,662, filed May 24th, 1924.

This invention has the same general objects as those disclosed in my copending application above noted, and is designed to provide a machine which may be quickly and easily changed from a "payer" basis to a "changer" basis and vice versa, which is provided with an automatic return which may be employed when desired to effect a transaction on the basis for which it is not set and to thereafter return to the basis for which it is set, which is adapted to return the change from a dollar or certain fractional parts, which is provided with double acting keys adapted to discharge a certain number of coins on their initial stroke, and a similar number of coins on their return stroke, and which are provided with what may be termed split change keys to deliver the equivalent of a dollar or certain fractions thereof in a number of different coins.

Further objects of this invention are to provide a multiple point discharge so that the machine may be adapted in a quick and easy manner to discharge from various points of the machine.

Further objects are to provide a machine of this general type having operating keys in which all of the keys stand at the same height, in which an increased stroke of certain of the keys, particularly those known as the multiple action keys are given by suitable means such as a depression formed in an upper portion of the machine, and in which the cross form of key is used throughout.

Further objects are to provide a simplified type of automatic return shift which is stronger than that disclosed in my copending application, and which has fewer parts and is of more simple design.

Further objects are to provide a coin handling machine which is of stronger and simpler construction than has heretofore been possible.

An embodiment of the invention is shown in the accompanying drawings, in which:—

Figure 5 is a fragmentary sectional view on the line 5—5 of Figure 4.

Figure 6 is a view from the rear of the machine showing a fragment thereof and illustrating the flap shifting mechanism.

Figure 7 is a detail of the automatic return shifting mechanism for the key board.

Figure 8 is a further detail of this automatic return shifting mechanism.

Figure 9 is a side view partly broken away of a part of the resiliently held key board shifting mechanism.

Figure 10 is a transverse sectional view on the line 10—10 of Figure 9.

Figure 11 is a similar view on the line 11—11 of Figure 9.

Figure 12 is a view of the keys and associated parts for altering the action of the machine to make it return change from a fractional part of a dollar.

Figure 13 is a sectional view on the line 13—13 of Figure 3.

Figure 14 is a sectional view on the line 14—14 of Figure 13, showing the cams in one position which they occupy.

Figure 15 is a sectional view on the line 15—15 of Figure 13.

Figure 16 is a view of the rear portion of the machine showing the locking means for locking the machine against action when any or all of the coin chutes are substantially empty.

Figure 17 is a sectional view on the line 17—17 of Figure 12.

Figure 18 is a view of a modified form of latching lever.

Figure 19 is a view of a modified form of latching lever, showing an automatic release therethrough.

Figure 1:
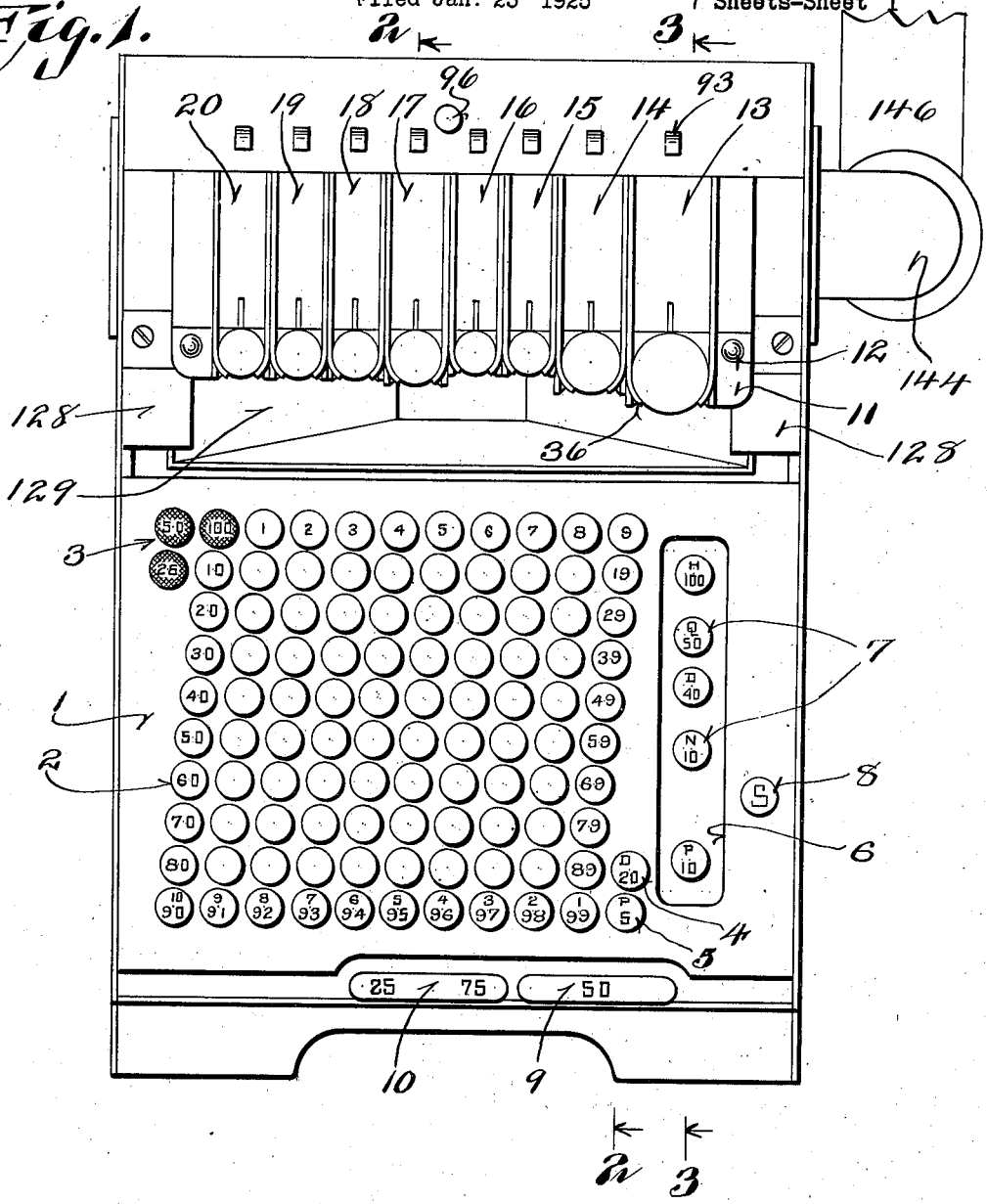
Figure 1 is a plan view of the complete machine showing the parts in the "changer" position.

The machine comprises a slidable keyboard 1 which is mounted in a forwardly and downwardly slanting position and carries a plurality of keys 2 which run from 1 to 99, as illustrated in Figure 1, and constitute either the "payer" keys or the "changer" keys.

A plurality of what may be termed split change keys, as indicated at 3, are grouped at suitable points on the machine, for instance the upper left hand corner of the keyboard, and constitute split change keys. These bear the designations 25, 50 and 100 and, as will be described later, discharge split change for a quarter for instance, two dimes and a nickel; for 50¢, a quarter, two dimes and a nickel; and for a dollar, a half dollar, a quarter, two dimes, and a nickel. The keyboard also carries a key 4 which is marked "D20" and is adapted to release two dimes, and a key 5 marked P5 which is adapted to discharge five pennies.

A cutout portion 6 is formed in the keyboard and within the outline of this cutout portion, a plurality of keys 7 are positioned. These keys, as will be described hereinafter, are adapted to operate in a depression and extend only to the height of the other keys. These keys are known as the double keys. For instance, the key marked "P10" is adapted to discharge five pennies on its downward stroke and five pennies on its upward stroke. The key marked N10 is adapted to discharge a nickel on its downward stroke, and a nickel on its upward stroke, and the remaining keys, in a similar manner, are adapted to discharge four dimes, two quarters and two fifty cent pieces; for instance, although the particular selection of coins may be varied by suitably altering the associated cams hereinafter described. It is understood, however, that these keys are so organized that they discharge a certain number of coins on their downward stroke, and a similar number of coins on their upward stroke, or any predetermined number of coins on the cycle.

An automatic return or auxiliary shift key 8 projects through the keyboard 1 and is adapted to be rocked either forwardly or rearwardly to accordingly move the keyboard for a single operation.

In the position of the parts shown throughout the figures of the drawings, the machine is set in its "changer" position, that is to say, with the keyboard raised, as shown.

The auxiliary shift key 8 is used to shift the keyboard for a single operation. The main shift key hereinafter described is employed to permanently shift the keyboard.

In these two positions the main keys 2 discharge, respectively, either the change from a dollar or else the exact amount indicated on the key, depending upon whether the keyboard occupies its "changer" or its "payer" position.

It is desirable to provide means for returning change from a 50¢ piece, from 75¢ or from 25¢. This is readily accomplished by providing an elongated key 9 marked 50, and elongated keys marked 25 and 75. When one of these keys is depressed it withholds that fraction of the dollar necessary to properly make change on these keys. In other words, if the customer makes a 9¢ purchase and pays 50¢, the operator depresses the 50¢ key indicated by the reference character 9 and thereafter the key 9 of the main keys indicated by the reference character 2. The purchaser receives 41¢ in change in proper coins, the key indicated by the reference character 9 withholding the 50¢ piece which would otherwise have been discharged.

The coins are carried in supply hoppers or coin holders which are mounted upon a base strip 11 extending transversely across the top portion of the machine and provided with apertures at its ends which fit over pins 12 carried by the body of the machine, thus permitting free removal of the coin hoppers. These coin hoppers consist of a hopper 13 adapted to receive 50¢ pieces; a hopper 14 adapted to receive 25¢ pieces; hoppers 15 and 16 adapted to receive dimes, a hopper 17 adapted to receive nickels, and hoppers 18, 19 and 20 adapted to receive pennies.

Figure 2:
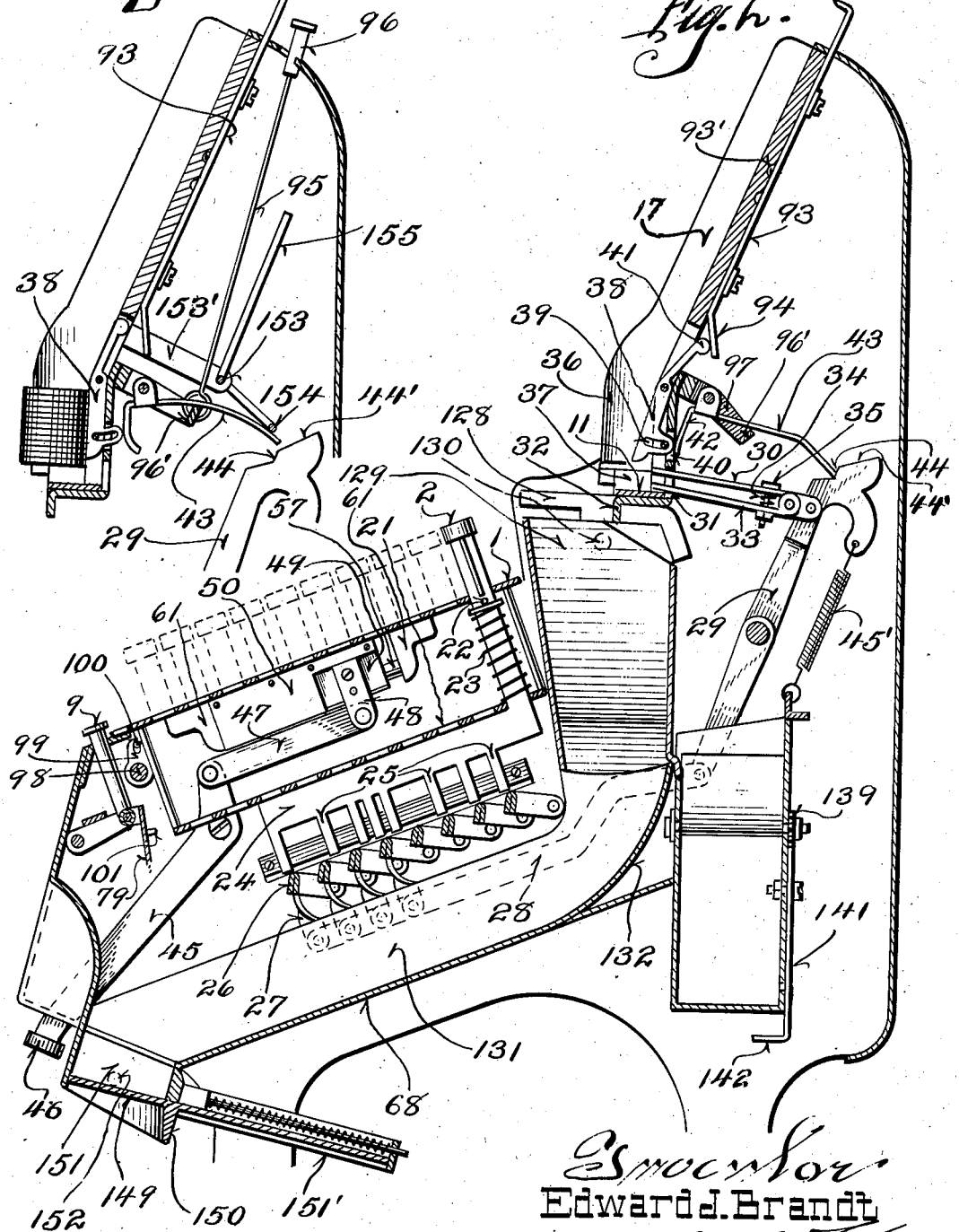
Figure 2 is a longitudinal sectional view on the line 2—2 of Figure 1.
Figure 3:
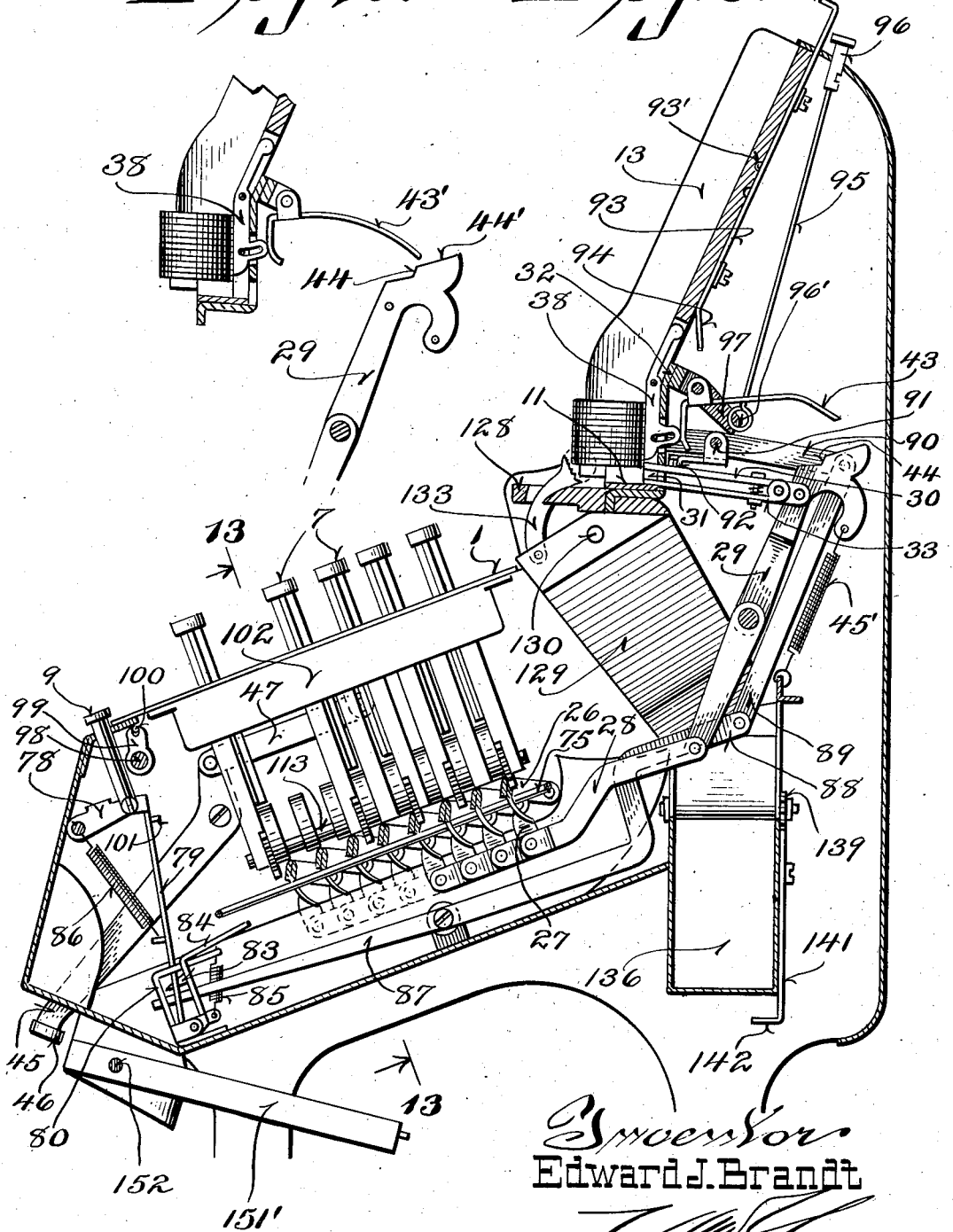
Figure 3 is a similar sectional view on the line 3—3 of Figure 1.

The mechanism for connecting the keys with the coin discharging plungers will now be described. This mechanism for connecting the main keys with the plungers is most clearly shown in Figure 2. Referring to this figure, it will be seen that the keyboard 1 is provided with a plurality of slots for the stems of the keys. These slots are arranged at right angles to receive the cross shaped stem of the keys, the cross shape of the keys being shown in Figure 2 and in greater detail in the sectional view Figure 15. One of the keys, of the group 2, for instance the key marked 9, is shown in full lines in the figure. It will be seen that the shank of this key projects downwardly through the keyboard 1 and through an intermediate plate 21 spaced from the keyboard 1 and rigidly connected thereto and adapted to slide therewith as a unit. The shank of the key, as stated, passes through both the keyboard and this intermediate plate. It is provided with a pin or shoulder 22 against which a coil spring 23 presses, the lower end of the spring bearing against the intermediate plate 21. The lower end of the shank is extended to provide a foot portion 24 provided with a plurality of downwardly extending fingers 25. These fingers are positioned above the upper transverse portion of rock arms 26, such rock arms being arranged in nested relation, as shown in Figures 2 and 3, and having short arms pivoted to the side of the machine. Each rock arm is provided with a rigidly attached crank arm 27 which is connected by means of a suitable link 28 with the appropriate lever 29. The levers 29 are each provided with a coin discharging plunger 30 which is pivoted to the upper end of the lever and projects through an aperture 31 in the upturned plate 32 at the rear of the machine. These coin plungers also project through suitable grooves or apertures 32' (see Figure 4) formed in the bottom portion of the coin holders.

It is to be noted that the plungers 31 are provided with a small lever 33 pivoted thereto. A spring 34 is positioned between the members 30 and 33 and an adjusting bolt 35 is passed through such members and through the spring to thus maintain the assembly of these parts.

The exact operation of the mechanism may be readily appreciated by considering the operation of one of the keys, for instance the key 9 of the main group 2, as shown in Figure 2. When this key is depressed, the fingers 25 engage certain of the rocking bars 26 and shift the appropriate plunger 30. For example, the fingers 25 are so arranged that they operate the 50¢ rock arm; the 25¢ rock arm; the 10¢ rock arm; the 5¢ rock arm, and the 1¢ rock arm, thus actuating the plungers corresponding thereto and discharging the corresponding coins.

In connection with the coin hoppers, it is to be noted from Figures 1, 2 and 3, that these hoppers slant downwardly and forwardly throughout their major portion, and that their lower ends are provided with inwardly curved fingers 36 (see Figure 1) which extend almost to the bottom of the hoppers and prevent inadvertent discharge of coins. The coins rest upon suitable ledges or base portions 37 (see Figures 2 and 3) within which the grooves or apertures for the reception of the plungers are formed. It is to be understood that the stroke of the plunger is such as to completely slide the lowermost coin or coins, depending upon the operation of the plungers, from the lower end of the stack of coins and thus prevent any inadvertent detention of these coins.

In order to prevent inadvertent operation of the machine when the coin supply is almost exhausted, means are provided for preventing the depression of the corresponding keys. This means consists of end levers 38 mounted in slots back of the coin hoppers, as shown in Figures 2 and 3, such levers being provided with a lower flat face which normally contacts with the coins, as shown in Figures 2 and 3. If desired, the levers may be provided with a lower arcuate slot 39 guided by a suitable pin and with a rearwardly projecting portion adapted to move outwardly through an aperture 40 in the rear plate 32 (see Figure 2). The upper end of the levers 38 are provided with angular projecting portions 41 for a purpose hereinafter to be described. When the coins are in the hoppers, they hold the levers 38 in the position shown in Figure 3, and the projecting rear portions of the levers contact with the short arm 42 of latching levers 43 and holds such latching levers in an elevated position, as indicated in Figure 3. However, when the coins in any of the hoppers are almost used up, the corresponding lever 38 rocks forwardly, as shown in Figure 2, and permits the latching lever 43 to move downwardly. This positions the rear end of the latching lever in front of a suitable shoulder 44 formed on the corresponding lever 29 and prevents such lever from being rocked and thus warns or notifies the operator. In the modified form of latching lever shown in Figure 18, substantially the same construction is followed except that the latching lever 43' rides upwardly upon the slanting edge 44' of the lever 29, under normal conditions, and thus temporarily relieves pressure against the lever 39 and permits a freer sliding of the coins.

It is to be noted that the levers 29 are normally held in the positions shown in Figure 3 by means of the springs 45'. When the machine is to be used in its "payer" position, the keyboard 1 is shifted downwardly, as stated. This may be most easily accomplished by means of a main shift lever 45 which has a projecting end or key 46 adjacent the lower forward portion of the machine, as clearly shown in Figures 2 and 3. This lever, (see Figure 4) projects through a slot 46' formed in the front bottom wall of the casing of the machine, and the slot is formed with shoulders in its ends to temporarily retain the lever.

The upper end of the lever 45 is connected by means of a pitman 47 with a projecting arm 48 carried by a slide 49. This slide is most clearly illustrated in Figures 9, 10 and 11. It will be noted that the slide 49 is carried in a suitable guide 50 secured to the side frame of the machine,—this guide, of course, being provided with a cutout portion, as shown in Figure 10 to accommodate the projection 48. The slide 49 is an elongated block provided with a channel on its lower side and provided with a cover strip 51 (see Figure 9) which passes across the ends of the channel or aperture 52 in the slide, and which extends across the top portion. This cover strip is provided with a folded portion forming an upper projection 53 which is locked by the stationary stopping blocks 54 carried by the side of the machine.

An upper and a lower plunger 55 and 56, respectively, are positioned within the channel 52 in the slide and have projecting reduced ends 57 and 58, respectively, which extend through the cover strip 51, as clearly shown in Figure 9. A relatively stiff spring 59 is carried within the channel 52 and bears at its ends against the plungers 55 and 56. If desired, a bar 60 may be loosely positioned within the spring to facilitate assembling. The ends of the plungers contact with lugs 61 carried by the keyboard 1. Thus when the shift lever 45 is operated it transmits motion to the slide 49. This slide, through the medium of the spring 59 yieldingly slides the keyboard in the appropriate direction until motion is arrested by the stop blocks 54.

It sometimes happens that when the machine occupies one of its main settings, for example the "changer" setting, as illustrated in the drawings, that it becomes necessary to transact one "payer" operation. The auxiliary or automatic return shift key 8 provides for this emergency. Referring to Figure 8, it will be seen that this key is secured to the upper end of a lever 62, and that such lever is provided with an elongated slot 63 adjacent its central portion which slidably and pivotally supports the lever upon a stationary pivot pin 64 carried by a stationary portion of the machine. The lower end of the lever 62 is provided with a pin 65 which is normally retained in contact with a plunger 66 carried in a block 67 mounted on the base plate 68 of the machine. The lever 62, as may be seen from Figure 7, is urged downwardly by means of a spring 69 so that it occupies normally the positions shown in Figures 7 and 8. It is to be noted, particularly from Figure 7, that the plunger 66 is rigidly secured to a transverse base or bar 70 from which a central arm 71, and an outer guide arm 72 project upwardly.

Figure 4:
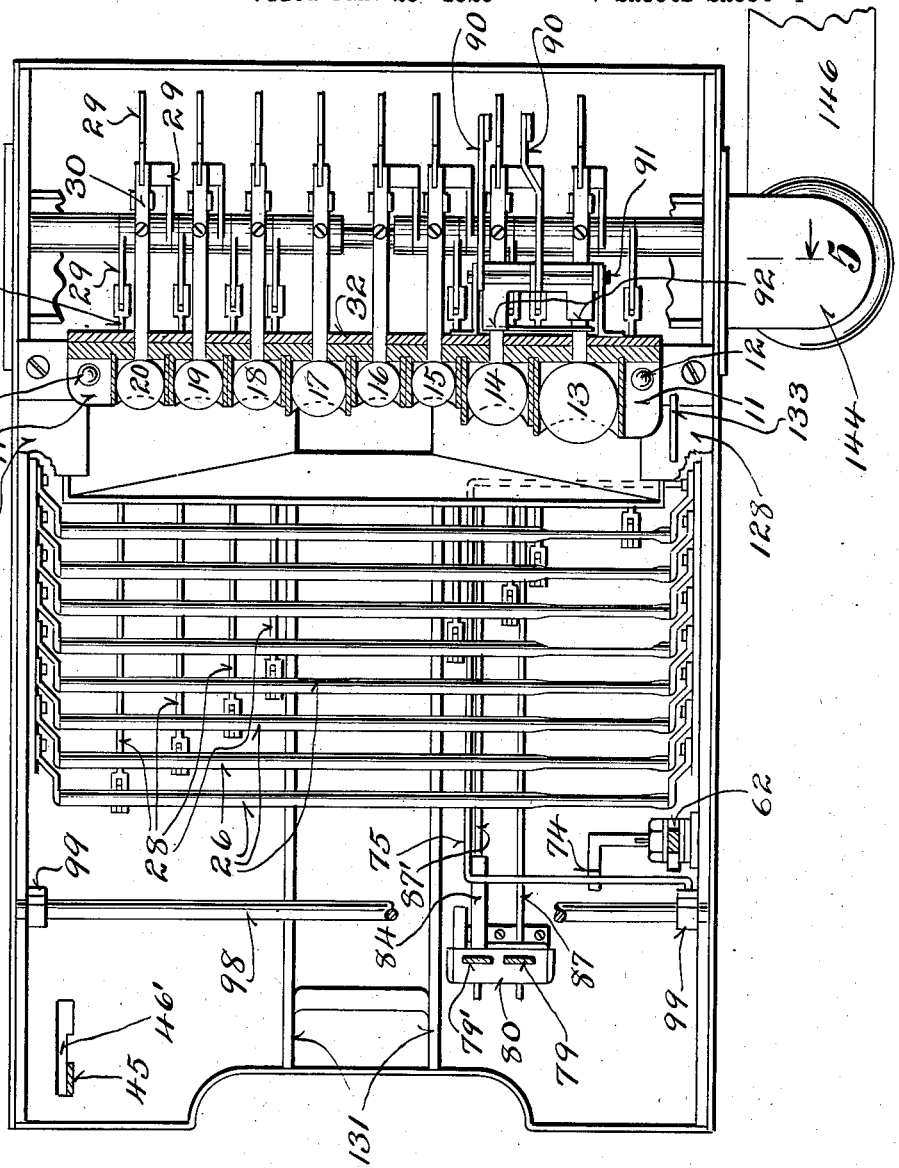
Figure 4 is a view of the machine corresponding to Figure 1 with the keyboard and associated plate removed and with the parts of the coin holders and associated strip in section.

The central arm 71 is urged upwardly by means of the spring 73 and is provided with an outwardly extending portion terminating in upper ears 74 which are pivoted to an intermediate portion of a trip bar 75, such bar being pivotally mounted in ears carried by the sides of the machine, as shown in Figures 4 and 7.

The trip bar 75 is U-shaped, as shown in Figure 4, and is provided with an elongated intermediate portion between its pivoted ends. This elongated portion extends beneath the rock arms 26, as is most clearly shown in Figures 3 and 4, so that when any of such levers are depressed the trip bar 75 is correspondingly depressed.

Referring again to Figure 8, it will be noted that the locking plunger 66 for the automatic return or auxiliary shift lever 62 is provided with a curved slot 76, and with a central stop 77 narrower than the main body of the plunger 66. The purpose of this construction will appear immediately.

The operation of the auxiliary or automatic return shift lever is as follows:—Assuming that the parts are set in their "changer" position, as shown throughout the drawings, the operator grasps the auxiliary shift key 8 and slightly elevates the lever 62 and rocks it downwardly and forwardly, thus rocking the pin 65 through the arcuate slot 76 into the dotted line position indicated in Figure 8. The pin 65 is now locked on the rear side of the plunger 66, as shown in dotted lines, and also the keyboard 1 is slid downwardly and forwardly against the action of the spring 59. (See Figure 9.) The "payer" transaction is effected by depressing the appropriate key of the group of keys indicated by the reference character 2. Depression of any of these keys operates certain of the rocker bars 26 which in turn depress the trip bar 75. (See Figure 4.) This in turn depresses the plunger 66 and allows the pin 65 to contact with the intermediate portion 77 of the plunger 66. (See Figure 8.) As long as the key of the group of keys 2 is depressed nothing further occurs, but as soon as the key of the group 2 is released the rocker bar or bars 26 rises and the trip bar 75 rises, thus raising the plunger 66 and permitting the pin 65 to ride through the arcuate slot 76 into its initial position, as shown in full lines in Figure 8, thus repositioning the keyboard 1 to its initial raised position.

The operations just described are thus executed by the machine when it is operated in its "changer" position and is returning change from the basis of a dollar. When it is desired, however, to return change from either 50¢, 75¢ or 25¢, the appropriate key 9 or 10 is depressed. In order to clearly illustrate this construction attention is directed to Figures 3, 4 and 12. Consider for instance the key 9 corresponding to change from a 50¢ piece. This key is connected with a lever 78, as shown most clearly in Figure 3, which is pivoted adjacent the forward portion of the machine. The lever also carries at its outer end a downwardly extending slide or bar 79 which projects through a guide 80. The slide 79 is provided with an upper and a lower aperture 81 and 82 which are selectively adapted to receive the cam shaped projecting portion 83 of a latch 84, such latch being provided with a rearwardly projecting arm, as clearly shown in Figure 3. The latch 84 is urged upwardly into the position shown in Figure 3 by means of a spring 85 and the slide 79 is correspondingly urged upwardly by means of the spring 86. It is to be understood that this latching member 84 is provided with a duplicate cam shaped projection 83 adapted to enter the apertures 81' or 82' of the slide 79' for the key 10, attention being directed to Figure 12. The lower ends of the slides 79 and 79' engage the forward ends of elongated levers 87 and 87' (see Figures 3, 4 and 12) which are pivotally supported intermediate their ends by the base plate, and which extend rearwardly and are provided with upwardly and outwardly extending portions 88, as shown in Figure 3.

Before describing the controlling action of these keys, attention is directed to the fact that when one of the keys 9, for instance, is depressed and locked temporarily in its depressed position, that depression of the other key 10 will release the depressed key 9. When the key 10 is depressed, the cam member 83, which is normally positioned within the lower apertures of the slides 79 and 79', is forced outwardly thus withdrawing the corresponding cam member 83 from the upper notch 81 of the slide 79, and thus permitting such slide and the corresponding key 9 to rise. Thus it is impossible to simultaneously retain both the keys 9 and 10 in depressed position.

The rear end of the levers 87 and 87' are connected by links with mechanism at the rear of the machine. One of the levers, for instance, the lever 87, will be described in detail herewith. This lever has its rear end 88 connected by means of the link 89 with the rear end of lever 90 pivoted adjacent the rear portion of the machine, as indicated at 91. The forward end of the lever 90 is provided with a downturned finger 92 adapted to depress the corresponding plunger 30. This plunger is the one for projecting 50¢ pieces from the corresponding coin hopper.

The operation of these keys 9 and 10 is, therefore, apparent for when the key 9, for instance, is depressed it renders the ejecting plunger for the 50¢ piece inoperative temporarily and thus permits the discharge of change on a basis of 50¢.

When the key 10 is depressed it similarly disables the 50¢ and 25¢ ejectors by depressing their corresponding plungers in a manner similar to that described in detail for the key 9. Thus, when it is necessary to return change from 75¢ it follows that the purchase is greater than 50¢ and the desired change is less than 25¢. Also when it is necessary to return change from 25¢ the desired change is less than 25¢.

These keys 9 and 10 are released by means of the tripping bar 75 (see Figures 3 and 4) such tripping bar being depressed by the operation of any of the rocking bars 26 and contacts with the latch 84; thus withdrawing the cam members 83 and permitting the upward motion of the slide 79 or 79' as the case may be.

It may be desirable to permit the operation of the machine irrespective of the controlling action of the coins in the coin hoppers 13. For instance, as shown in Figure 3, a manually manipulable slide 93 may be provided with a downturned cam end 94 adapted to be positioned in the path of the upper end of the lever 38, and thus render the lever inoperative. Suitable temporary latching means, such as indicated at 93' may be provided for holding the slide 93 in its adjusted position. Further, it may be desirable to simultaneously render all of the levers inoperative, which in turn renders the corresponding latching lever 43 inoperative. This is accomplished by means of a rod 95 provided with a notched manipulating upper knob 96. The lower end of this rod 95 is connected to a transverse bar 96' extending beneath all of the latches 43 and supported pivotally by inturned arms 97 adjacent its ends.

It is to be understood that the operation of the different parts of the machine are made as free as possible by improved construction, but it is not thought necessary to detail these features as they are well understood. For instance, as disclosed in my above noted case, rollers may be provided for the slidable keyboard 1. However, it is desirable to insure against tilting of the keyboard when it is manipulated from the main shift lever 45. This is readily accomplished by providing a relatively rigid rock shaft 98 extending transversely of the machine, as shown in Figures 2, 3 and 4. This rock shaft is provided at its ends with short levers 99 which are notched or slotted at their ends and receive pins 100 rigidly associated with the keyboard 1 on the lower side thereof. These pins or projections carried by the keyboard are located at opposite sides and engage the levers 99 at opposite ends of the rock shaft 98. This construction insures uniform motion of opposite sides of the keyboard and prevents tilting and binding.

In connection with the shifting of the keyboard 1, it will be understood, as described in my copending application noted above, that the fingers 25 (see Figure 2) which are connected with the main keys 2 are positioned over the appropriate rock arms 26 to cause the discharge of the appropriate number of coins when in "changer" position, and when shifted, such keys engage the appropriate set of rock bars 26 to discharge the proper coins for the "payer" operation.

Further, it may be desirable to prevent the operation of the keys 9 and 10 during "payer" setting or position of the keyboard, as operation of these keys would merely interfere with the correct discharge of coins during "payer" operation. This is accomplished by providing cooperative means between the slides 79 and 79′ and the keyboard. For instance, in the view Figure 17 which is a section through the slide 79′, it will be noted that a pin 101 is attached to the slide and is adapted to be positioned above the forward edge of the keyboard 1 when such keyboard is slid downwardly or forwardly into "payer" position. This locks the keys 9 and 10 against operation during the "payer" setting of the machine.

It is frequently desirable to discharge a number of coins, at one time, of a certain predetermined value. This is readily accomplished by the multiple payment or double action keys 7. These keys are carried in a unit 102 (see Figure 13) which is provided with a depressed or channel like portion 103 adapted to permit a relatively great movement of the keys. The keyboard 1 is cut out, as indicated at 6, as previously described, to permit the passage of the keys 7 therethrough. By having this depressed portion, it is possible to secure the additional travel of the keys 7 without requiring their projection above the remaining keys.

From reference to Figures 13 and 15, it will be noted that the keys are slidably held in the channels formed in the member 102 by means of a clip or bracket 104 which is provided with an offset portion to receive the angular or cross shaped section of the keys, as clearly shown in Figure 15. The member 102 is integral with all of the downwardly projecting extensions shown in Figures 13, 14 and 15. This bracket is preferably extended outwardly to provide an ear 105 to which one end of the retracting spring 106 is secured. The other end of this spring is secured to an offset ear 107 (see Figure 13) formed on the shank 108 of the key. The shanks 108 are provided with a cutout portion 109 within which the projection 110 of the main member 102 is positioned, which thus limits the stroke of the keys. It is to be noted that the shanks 108 of each of the keys are equipped with rack teeth 111 which mesh in each case with a corresponding pinion 112. The pinions of the separate keys are secured to their respective shafts and are independently actuable by the keys. For example, the key P10 in Figure 1 controls the action of the shaft 113. (See Figure 14.) This shaft carries three cams 114, 115 and 116. The cams are rocked from the position shown in dotted lines at 114′ to the dotted line position indicated at 114″ in Figure 13, on the depression of the key and are again rocked by the spring 106 back to their initial position. In this manner the cams act twice upon the cam followers. The cam followers, it will be noted from Figure 3, are the rock arms 26 above which the several cams are positioned. For example, the cams 114, 115 and 116 actuate the rock arms controlling the plunger acting through the hoppers 20, 19 and 18, respectively. These plungers are so set that they discharge, respectively, one, two and two pennies from the hoppers, thus five pennies are discharged on the down stroke of the key and five pennies are discharged on the up stroke, as the keys are given two rocking strokes for each complete downward and upward travel of the double acting keys 7.

The key of the group 7 in Figure 1, marked N10 controls the short shaft 117 to which the cam 118 is rigidly attached. This cam controls the plunger operating in the nickel hopper 17 (see Figure 1) and causes such plunger to make two working strokes for each complete cycle of operation of the key thus discharging two nickels. In a similar manner the key of the group 7, marked D40, controls the shaft 119 upon which the cams 120 and 121 are rigidly secured. These cams operate the plunger in the two dime compartments or hoppers 16 and 15 and thus discharge two dimes on the downward stroke and two dimes on the upward stroke. In a similar manner the key of the group 7, marked Q50, discharges two quarters through the action of the shaft 122 and the cam 123, and the key marked H100 of the group 7 through the medium of the shaft 124 and the cam 125 discharges two 50¢ pieces.

This complete unit of double acting keys is, as stated, carried by the member 102. The member 102 is secured by means of screws 126 to the side frame of the machine, as shown in Figure 13, but in order to afford a very rigid support for this member, an additional means is employed, namely, the vertical strut or brace rod 127, as clearly shown in Figures 13 and 14. This bracing rod extends downwardly and rests upon the bottom 68 of the machine and affords a very secure support for the double key unit.

A pair of blocks 128 (see Figures 1, 3, 4 and 5) are secured to the side frame adjacent its upper rear portion. Between these blocks a main receiving chute 129 (see Figure 5) is pivotally positioned and carried by means of trunnions or pins 130. This hopper normally hangs vertically downwardly and discharges into a centrally and forwardly slanting chute formed by the side walls 131 (see Figures 2 and 4) and bottom plate 68. The rear portion of this channel is provided with a curved plate 132, as clearly shown in Figure 2.

The position of the swinging or main chute 129 for discharging into the central channel is shown in Figure 2. However, when it is desired to discharge the coins rearwardly, the chute 129 is rocked rearwardly into the position shown in Figure 3, and held in such position by means of the latch 133 which operates through a slot formed in one of the blocks 128, as shown in Figures 3 and 4, thus permitting ready rocking of the chute rearwardly.

When the chute is in this rearwardly rocked position, it discharges into the mouth 134 (see Figure 5) of a rear composite chute. This composite chute has two laterally extending chutes 135 and 136. A deflector 137 is rigidly carried by a shaft 138 and mounted at the junction of the chutes 135 and 136, and thus selectively determines the active chute through which the coins will be discharged. As shown in Figure 5, the coins will be discharged through the chute 136 for the position of the parts indicated. The shaft 138 extends through the rear wall of the device and rigidly carries a small pinion 139 which in turn meshes with a segmental gear 140 rigidly formed with a rock arm 141. The flap controlling rock arm 141 is also shown in Figure 3, and it will be seen that it is provided with an angularly turned manipulating handle 142. Preferably, the rock arm 141 is somewhat springy and is provided with a projection adapted to fit in either of the two apertures or depressions 143 (see Figure 6) to thus temporarily lock the flap or deflector 137 in the desired position.

Any suitable means may be attached to the outer ends of the three chutes. For instance, the lateral rear chutes may be provided with a fitting 144 which is bolted to the chute in use; the other chute being covered by any suitable or ornamental type of plate 145. The bracket 144 may conveniently carry a laterally bent discharge pipe 146. It is to be noted that this pipe is provided with a beaded upper end 147 which is received in the correspondingly grooved or shaped portion 148 of a fitting 144. This provides a swivel connection between the discharge pipe and the machine and permits the discharge of coins in any desired direction from the machine.

The forwardly discharging chute may be provided with a closure plate 149 (see Figure 2) which is spring pressed to closed position. This closure plate is provided in the conventional manner with a finger piece 150 so that the operator may slide his hand beneath the discharge spout 151 of the forwardly extending chute and slide the plate 149 out of the way by pressing the ends of his fingers against the finger piece 150. When he removes his hand the slide immediately closes the discharge throat of the chute.

It is to be particularly emphasized that the machine is extremely flexible in its use and is adapted to discharge either from the front or rear or side thereof and when discharging from the rear is adapted to discharge from either side of the machine, as indicated in Figure 5 of the drawing. Thus when pay rolls are made up an envelope may be placed beneath the discharge pipe 146 and the proper amount discharged therein in a very rapid manner. Further, it is clear the pipe 146 may lead the change to a customer, for instance, and if desired may be readily positioned at any desired point.

It is clear, therefore, that the operator is not called upon to handle the change when delivering it to the customer, but is merely required to press the appropriate key.

Further, it is to be noted that the machine may be quickly changed back to the forward discharge position by releasing the latch 133 (see Figure 3) and permitting the main or pivotally mounted chute 129 to swing into its vertical position, as shown in Figure 2.

It is to be noted from Figures 2 and 3 that the guide portion 151' may be provided with a pair of apertures 152 which are adapted to receive suitable lugs or fastening parts from coin guiding attachments to thus adapt the apparatus to other uses from those described in detail.

In the modified form shown in Figure 19 substantially the same latching mechanism is employed. However, it will be noted that a transversely extending rod 153 is carried in brackets 153'. It is connected with a movable transverse rod 154 by end pieces, as shown in Figure 19. This movable rod is positioned above the levers 43 and, therefore, when any of the levers 43 are elevated due to actuation of the lever 29, as described in connection with Figure 18, such rod 154 will be rocked upwardly. This upward rocking motion is transmitted to an arm 155 adapted to contact with the rod 95 and thus detach the notched knob 96 and permit release of the bar 96' previously described. Thus this mechanism will insure restoration of the parts after a temporary latching of the member 96 without any further thought on the part of the operator.

A further use of this device may be had when a coin hopper becomes nearly exhausted and the latch operates. The operator then releases this latch by drawing upwardly upon the knob 96 and permits a further operation of the keys. However, after this operation, the latch releasing means is tripped and the latch is again effective.

It is to be further noted that other keys than those specifically described may be provided for giving a multiple actuation of the ejector mechanism. For example, it is within the province of this invention to provide multiple operation from any other of the keys disclosed in this case.

It will be seen, therefore, that a coin delivery machine has been provided which is adapted for a large variety of uses, and which is adapted to discharge the coins either into the hand of the operator or to the customer from either side of the machine.

It will further be seen that a coin delivery machine has been provided which will perform a very large number of complicated transactions in a simple and rapid manner without requiring thought on the part of the operator.

It is to be noted also that the machine, although performing a large number of complicated operations, is very simple and strong in construction, and is easily operated.

Although the invention has been described in considerable detail, it is to be understood that the invention may be variously embodied and is, therefore, to be limited only as claimed.

I claim:

1. In a coin delivery machine having coin compartments and coin ejector mechanism including a series of rocker bars, the combination of key-controlled oscillatory shoes arranged longitudinally of the rocker bars for actuating the same, each shoe being adapted to oscillate about a definite axis.

2. In a coin delivery machine having coin compartments and coin ejector mechanism including a series of rocker bars, key-controlled shoes engageable with the rocker bars, and actuating means associated therewith for imparting a dual actuating movement to the bars incidental to one key movement.

3. In a coin delivery machine having coin hoppers and coin ejectors including movable arms, the combination of a plurality of members adapted to engage certain of said movable arms and each having similarly shaped portions, and keys for selectively operating said members to cause said portions to successively engage said arms to thereby cause a double action of the appropriate arm for each operation of the corresponding key.

4. In a coin delivery machine having coin hoppers and coin ejectors including movable arms, the combination of a plurality of members adapted to engage certain of said movable arms and each having similarly shaped portions, and keys for selectively operating said members to cause said portions to successively engage said arms to thereby cause a double action of the appropriate arm for each operation of the corresponding key, certain of said members being connected for simultaneous operation, whereby operation of certain of said keys cause double action of a plurality of said arms.

5. In a coin delivery machine, the combination of a plurality of coin hoppers for holding coins of different denominations, coin ejectors for removing coins from said hoppers, rocker bars for operating said ejectors, a plurality of cams mounted above said rocker bars, and keys for selectively rotating said cams.

6. In a coin delivery machine, the combination of a plurality of coin hoppers for holding coins of different denominations, coin ejectors for removing coins from said hoppers, rocker bars for operating said ejectors, a plurality of cams mounted above said rocker bars, and keys for selectively rotating said cams, said cams having similar faces for causing a double action of said rocker bars for each operation of said keys.

7. In a coin delivery machine, the combination of a plurality of coin hoppers for holding coins of different denominations, coin ejectors for removing coins from said hoppers, rocker bars for operating said ejectors, cams mounted above said rocker bars, and keys for rocking said cams to cause a double action of said rocker bars for each operation of said keys, certain of said cams being rigidly carried by a single shaft, whereby operation of certain of said keys cause simultaneous rotation of a plurality of said cams.

8. In a coin delivery machine, the combination of a plurality of coin receiving hoppers adapted to hold coins of different denominations, coin ejectors for removing coins from said hoppers, a plurality of rocker bars for operating said ejectors, a shiftable keyboard having a plurality of keys for actuating said bars in either of two combinations depending upon the position occupied by said keyboard, a plurality of permanently positioned cams for operating said rocker bars and keys for operating said cams.

9. In a coin delivery machine, the combination of a plurality of coin receiving hoppers, adapted to hold coins of different denominations, coin ejectors for removing coins from said hoppers, a plurality of rocker bars for operating said ejectors, a shiftable keyboard having a plurality of keys for actuating said bars in either of two combinations depending upon the position occupied by said keyboard, a plurality of permanently positioned cams for operating said rocker bars, and keys for operating said cams, said last mentioned keys being carried by a stationary portion of said machine.

10. In a coin delivery machine, the combination of a plurality of coin hoppers, ejectors for removing coins therefrom, rocker bars for operating said ejectors, a keyboard, a plurality of keys carried thereby and adapted to actuate said rocker bars, a unit associated with said keyboard and having a plurality of keys, and a plurality of members carried by said unit for causing a double action of said rocker bars, said members being operatively coupled to said last mentioned keys, said unit having a depression affording a longer travel of said last mentioned keys than said first mentioned keys.

11. In a coin delivery machine, the combination of a plurality of coin hoppers, ejectors for removing coins therefrom, rocker bars for operating said ejectors, a keyboard, a plurality of keys carried thereby and adapted to actuate said rocker bars, a unit associated with said keyboard, a plurality of keys carried by said unit and having longer shanks than said first mentioned keys, and a plurality of members carried by said unit for causing a double action of said rocker bars, said members being operatively coupled to said last mentioned keys, said unit having a depression affording a longer travel of said last mentioned keys than said first mentioned keys, whereby said keys all stand at the same height.

12. In a coin delivery machine the combination of a plurality of coin holding hoppers, ejectors for removing coins from said hoppers, rocker bars for actuating said ejectors, a keyboard, a plurality of keys carried thereby and adapted to selectively operate said rocker bars, a separate unit distinct from said keyboard and carrying a plurality of cams adapted to actuate said rocker bars, and keys carried by said unit for rotating said cams.

13. In a coin delivery machine, the combination of a plurality of coin hoppers for containing coins of different denominations, a plurality of coin ejectors for removing coins from said hoppers, a shiftable keyboard, means for yieldingly holding said keyboard in either of two positions, a plurality of keys carried by said keyboard, a plurality of rocker arms mounted below said keyboard and adapted to be operated by said keys in either of two different combinations depending upon the position of said keyboard, a shift lever operatively connected with said keyboard and adapted to move said keyboard, and means for temporarily holding said lever in fixed position, said means being released by any of said rock arms.

14. In a coin delivery machine, the combination of a plurality of coin hoppers for containing coins of different denominations, a plurality of coin ejectors for removing coins from said hoppers, a shiftable keyboard, means for yieldingly holding said keyboard in either of two positions, a plurality of keys carried by said keyboard, a plurality of rocker bars mounted below said keyboard and adapted to be operated by said keys in either of two different combinations depending upon the position of said keyboard, a shift lever operatively connected with said keyboard and adapted to move said keyboard, and a locking plunger for holding the said shift lever in either position against the action of said yielding means, and means for operating said locking plunger upon the actuation of any of said rocker bars.

15. In a key controlled machine, the combination of a plurality of mechanisms for effecting different operations, a body portion housing said mechanisms, a keyboard slidably carried by said body portion, a plurality of keys carried by said keyboard and having depending portions adapted to register with said mechanisms in either of two arrangements depending upon the position of said keyboard, a rocker shaft extending transversely of said body portion, and arms carried adjacent the ends of said rocker shaft and operatively engaging opposite sides of said keyboard.

16. In a coin delivery machine, the combination of a body portion, a plurality of coin hoppers carried thereby, means for discharging coins from said hoppers, a keyboard slidably supported by said body portion, a plurality of keys carried by said keyboard for engaging said means in either of two combinations depending upon the position of said keyboard, and a rocker shaft extending transversely of said body portion and connected at opposite ends with said keyboard for insuring uniform motion of both sides of said keyboard.

17. In a coin delivery machine, the combination of a body portion, coin hoppers carried thereby, ejectors for removing said coins, rocker bars for operating said ejectors, a shiftable keyboard carried by said body portion, a plurality of keys carried by said keyboard and adapted to selectively engage said rocker bars in two different combinations depending upon the positions of said keyboard, a shift lever for shifting said keyboard, a member connected with said shift lever, a pair of plungers projecting outwardly from said member and operatively connected to said keyboard, and a spring urging said plungers outwardly.

18. In a coin delivery machine the combination of a body portion, coin hoppers carried thereby, mechanism for ejecting coins, a keyboard slidably carried by said body portion and having a plurality of keys adapted to actuate said mechanism, a shift lever carried by said body portion, a tubular member connected with said shift lever, a pair of plungers projecting from opposite ends of said tubular member and operatively connecting with said keyboard, and a spring interposed between said plungers.

19. In a coin delivery machine the combination of a body portion, a plurality of coin hoppers carried thereby, mechanism for ejecting coins from said hoppers, a slidable keyboard carried by said portion and having depending lugs, a plurality of keys carried by said keyboard and adapted to selectively operate said mechanism, a shift lever pivoted to said body portion, a slide connected with said shift lever and guided by said body portion, a pair of plungers projecting from opposite ends of said slide and engaging said lugs, and a spring interposed between said plungers.

20. In a coin handling machine, the combination of a plurality of coin hoppers, a plurality of ejectors for removing coins from said hoppers, keys for actuating said ejectors to remove predetermined amounts of coins corresponding to change from a given unit, a plurality of means for changing the action of the machine to correspond to any of several different units, said means being interrelated, whereby actuation of one releases all others.

21. In a coin delivery machine having coin compartments and coin ejector mechanism, operating keys, and means driven from said keys for imparting a multiple action to the coin ejector mechanism for each operation of the keys.

22. In a coin delivery machine having coin compartments and coin ejector mechanism, the combination of keys and oscillatory shoes actuated by said keys for operating said ejector mechanism, each shoe being adapted to oscillate about a definite axis.

23. In a coin delivery machine, the combination of a plurality of coin hoppers for holding coins of different denominations, coin ejectors for removing coins from said hoppers, a plurality of cams for operating said coin ejectors, and keys for selectively rotating said cams.

24. In a coin delivery machine, the combination of a plurality of coin receiving hoppers adapted to hold coins of different denominations, coin ejectors for removing coins from said hoppers, means for operating said ejectors, a shiftable keyboard having a plurality of keys for actuating said means in either of two combinations depending upon the position occupied by said key board, a plurality of permanently positioned cams for actuating said means, and keys operating said cams, said last mentioned keys being carried by a stationary portion of said machine.

25. In a coin delivery machine, the combination of a movable keyboard, a plurality of keys carried thereby, coin delivery mechanism operated by said keys, a separate unit distinct from said keyboard, and keys carried by said unit for additionally operating said coin delivery mechanism.

26. In a coin delivery machine, the combination of a plurality of coin hoppers, ejectors for removing coins from said hoppers, a plurality of keys for operating said ejectors, locking means controlled by the coins in the hoppers for locking said ejectors when the coin supply is low, releasing means for releasing said locking means, and means operated upon actuation of any key for restoring said releasing means.

27. In a coin delivery machine having coin compartments and coin ejector mechanism, means for operating said ejector mechanism, key controlled shoes for actuating said means, and means for causing a multiple action of said means for each cycle of operation of said keys.

28. In a coin delivery machine having a plurality of coin hoppers and coin ejectors therefor, means for operating said ejectors, key controlled shoes for actuating said means, and means for simultaneously causing a multiple action of a plurality of said ejectors for a single cycle of operation of a key, whereby a plurality of coins may be delivered from each of several hoppers by depressing a single key.

In testimony that I claim the foregoing I have hereunto set my hand at Watertown, in the county of Jefferson and State of Wisconsin.

EDWARD J. BRANDT.